United States Patent [19]

Fendley et al.

[11] Patent Number: 4,828,523

[45] Date of Patent: May 9, 1989

[54] TENSION MASK SECUREMENT MEANS AND PROCESS THEREFORE

[75] Inventors: James R. Fendley, Arlington Heights; Janice L. Wichmann, Park Ridge, Both of Ill.

[73] Assignee: Zenith Electronics Corporation, Glenview, Ill.

[21] Appl. No.: 58,095

[22] Filed: Jun. 4, 1987

[51] Int. Cl.$^4$ .............................................. B23K 26/02

[52] U.S. Cl. ................................ 445/30; 219/121.63; 219/121.79

[58] Field of Search .................. 445/30; 219/121 LA, 219/121 LC, 121 LD, 121 LU, 121 LV

[56] References Cited

U.S. PATENT DOCUMENTS

| | | | |
|---|---|---|---|
| 2,625,734 | 1/1953 | Law . | |
| 2,654,940 | 10/1953 | Law . | |
| 3,894,321 | 7/1975 | Moore . | |
| 4,461,945 | 7/1984 | O'Cheskey et al. | 219/121 LC |
| 4,547,696 | 10/1985 | Strauss . | |
| 4,560,856 | 12/1985 | Miller et al. | 219/121 LA |
| 4,591,344 | 5/1986 | Palac . | |
| 4,695,761 | 9/1987 | Fendley | 313/407 |
| 4,710,606 | 12/1987 | Soroka et al. | 219/121 LV |

FOREIGN PATENT DOCUMENTS

| | | | |
|---|---|---|---|
| 121628 | 10/1984 | European Pat. Off. | 445/30 |
| 106687 | 8/1985 | Japan | 219/121 LD |

OTHER PUBLICATIONS

"Pulsed Laser Beam Welding", *Metals Handbook*, 9th Ed., vol. 6, American Soc. for Metals, Metals Park, Ohio, 1983, pp. 656–657.

*Welding Engineer*, Aug. 1970, pp. 42–44.

Improvements in the RCA Three—Beam Shadow Mask Color Kinescope, by Grimes et al., IRE, Jan. 1954.

*Primary Examiner*—Kenneth J. Ramsey

[57] ABSTRACT

A front assembly for a color cathode ray tube is disclosed. The tube includes a faceplate having on its inner surface a centrally disposed phosphor screen embraced by a peripheral sealing area adapted to mate with a funnel. A faceplate-mounted frame-like shadow mask support structure secured to the inner surface of the faceplate between the sealing area and the screen has a mask-receiving surface for receiving and supporting a foil shadow mask and holding the mask in tension by laser weldments. The weldments according to the invention are spaced close enough to hold the mask in tension without distortion, yet spaced widely enough to provide for relatively rapid welding and strong, independent welds. The welding apparatus includes mapping means for determining variations in the positions or contour of the mask receiving surface and responsive numeric control means for determining the desired weld path.

17 Claims, 7 Drawing Sheets

TENSION MASK SECUREMENT MEANS AND PROCESS THEREFORE

CROSS-REFERENCE TO RELATED APPLICATIONS AND PATENTS

This application is related to but in no way dependent upon copending applications Ser. No. 832,493 now U.S. Pat. No. 4,730,143; Ser. No. 831,699 now U.S. Pat. No. 4,721,488; Ser. No. 831,696 now U.S. Pat. No. 4,686,416; Ser. No. 866,030 now U.S. Pat. No. 4,737,681; Ser. No. 119,765, now U.S. Pat. No. 4,776,822; Ser. No. 60,135, now U.S. Pat. No. 4,778,427; Ser No. 138,994 filed Dec. 29, 1987; Ser. No. 140,070 filed Dec. 31, 1987; and U.S. Pat. Nos. 3,894,321; 4,069,567; 4,547,696; 4,591,344; 4,593,224; 4,595,857; and 4,656,388, all of common ownership herewith.

This specification includes an account of the background of the invention, a description of the the best mode presently contemplated for carrying out the invention, and appended claims.

BACKGROUND OF THE INVENTION

Field of the Invention

This invention relates to color cathode ray picture tubes, and is addressed specifically to an improved means and process for securing an expanded foil mask to a shadow mask support structure that extends from the inner surface of a faceplate. Color tubes of various types having the tension foil mask can be manufactured by the process, including those used in home entertainment television receivers. The process according to the invention is of particular value in the manufacture of medium-resolution, high-resolution, and ultra-high resolution tubes intended for color monitors.

The use of the foil-type flat tension mask and flat faceplate provides many benefits in comparison to the conventional domed shadow mask and correlatively curved faceplate. Chief among these is a greater power-handling capability which makes possible as much as a three-fold increase in brightness. The conventional curved shadow mask, which is not under tension, tends to "dome" in picture areas of high brightness where the intensity of the electron beam bombardment is greatest. Color impurities result as the mask moves closer to the screen and as the beam-passing apertures move out of registration with their associated phosphor elements on the screen. When heated, the tension mask distorts in a manner quite differently from that of the conventional mask. If the entire mask is heated uniformly, there is no doming and no distortion until tension is completely lost; just before that point, wrinkling may occur in the corners. If only portions of the mask are heated, those portions expand, and the unheated portions contract, resulting in displacements within the plane of the mask; i.e., the mask remains flat.

The tension foil shadow mask is a part of the cathode ray tube front assembly, and is located closely adjacent to the faceplate. The front assembly primarily comprises the faceplate with its screen which consists of deposits of light-emitting phosphors, a shadow mask, and support means for the mask. As used herein, the term "shadow mask" means an apertured metallic foil which may, by way of example, be about 0.001 inch thick, or less. The mask must be supported in high tension a predetermined distance from the inner surface of the cathode ray tube faceplate; this distance is known as the "Q-distance." As is well known in the art, the shadow mask acts as a color-selection electrode, or parallax barrier, which ensures that each of the three electron beams lands only on its assigned phosphor deposits.

PRIOR ART

U.S. Pat. No. 3,894,321 to Moore, of common ownership herewith, is directed to a method for processing a color cathode ray tube faceplate in conjunction with a thin foil tension shadow mask. A front panel is disclosed that has an inner ledge that forms a continuous path around the screen. No details as to the means for securing a foil mask to the inner ledge are provided, other than a statement that the mask is "sealed" to a ledge.

The use of a laser as a means for welding a foil mask on a shadow mask support attached to the inner surface of a faceplate is described in application Ser. No. 832,493 filed Feb. 21, 1986, of common ownership herewith, and titled "Improved Color Cathode Ray Tube Having a Face-Plate-Mounted Metal Frame with a Welded-on Tension Foil Shadow Mask." No information concerning the welding process is given, other than the statement: "The welding process may be electrical resistance welding or laser welding."

In U.S. Pat. No. 4,591,344 to Palac, of common ownership herewith, a method of making a color cathode ray tube is disclosed in which a frame on which a shadow mask is stretched has indexing means cooperable with registration-affording means on a faceplate. The assembly provides for multiple registered matings of the faceplate and mask during photoscreening operations. The sealing areas of the faceplate and the frame are joined in a final assembly operation such that the frame becomes an integral constituent of the cathode ray tube.

A mask registration and supporting system for a cathode ray tube having a rounded faceplate with a skirt for attachment to a funnel is disclosed by Strauss in U.S. Pat. No. 4,547,696 of common ownership herewith. The skirt of the faceplate provides the necessary Q-distance between the mask and the screen. A frame dimensioned to enclose the screen comprises first and second space-apart surfaces. A tensed foil shadow mask has a peripheral portion bonded to a second surface of the frame. The frame is registered with the faceplate by ball-and-groove indexing means. The shadow mask is sandwiched between the frame and a stabilizing or stiffening member. Following final assembly, the frame is permanently fixed in place within the tube envelope between the sealing lands of the faceplate and a funnel, with the stiffening member projecting from the frame into the funnel.

In referent copending application Ser. No. 831,696 of common ownership herewith, there is disclosed an apparatus for tensing a shadow mask foil. The apparatus comprises a pedestal having registration-affording means, and a tensing structure that includes a fixture comprising a pair of collars for clamping the edge of a shadow mask foil to support and maintain the foil taut. An anvil is provided for engaging a peripheral portion of the clamped foil to induce deflection of the foil and, thereby, a predetermined tension in the foil. Following a photoscreening process, the mask is secured to shadow mask supports extending from the faceplate by, for example, welding by laser.

There has been a number of disclosures of tensed foil masks and means for applying and maintaining mask tension. Typical of these is the disclosure of Law in U.S. Pat. No. 2,625,734, which addresses the construction of a taut, planar, foraminous mask, and the mounting of the mask and target (the screen on the faceplate) as a unitary assembly within the envelope. The thin metal is clamped in a frame, and the mask is heated and placed under screw tension. Upon cooling, the metal contracts and the mask is thus rendered taut and held in tension by the frame. A photographic plate is used in a process for applying phosphor elements to the faceplate screening surface to provide an interchangeable mask system, rather than using a shadow mask mated with the faceplate to serve as an optical stencil during photoscreening. Law in U.S. Pat. No. 2,654,940 discloses means for stretching and captivating masks formed of mesh screens by frame means.

In a journal article, there is described means for mounting a flat tension mask on a frame for use in a color cathode ray tube having a circular faceplate with a curved viewing surface. In one embodiment, the mask, which is also circular, is described as being welded to a circular frame comprised of a ⅛-inch steel section. The frame with captivated mask is mounted in spaced relationship to a phosphor-dot faceplate, and the combination is assembled into the tube as a package located adjacent to the faceplate. ("Improvements in the RCA Three-Beam Shadow Mask Color Kinescope," by Grimes et al. IRE, Jan. 1954; decimal classification R583.6.)

OBJECTS OF THE INVENTION

It is a general object of this invention to provide means and a process for facilitating the manufacture of color cathode ray tubes having a tension foil shadow mask.

It is another general object of this invention to provide an improved means and process for securing a foil tension mask to a mask support.

It is another object of this invention to provide a feasible means and process for securing a relatively thin steel foil shadow mask which is under tension to a relatively thick mask support made of a special steel alloy.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, noted as being not to scale, in the several figures of which like reference numerals identify like elements, and in which:

DESCRIPTION OF THE PREFERRED EMBODIMENT

To facilitate understanding of the means and process according to the invention, a brief description of a tension mask color cathode ray tube and its major components is provided in the following paragraphs.

Figure 1:
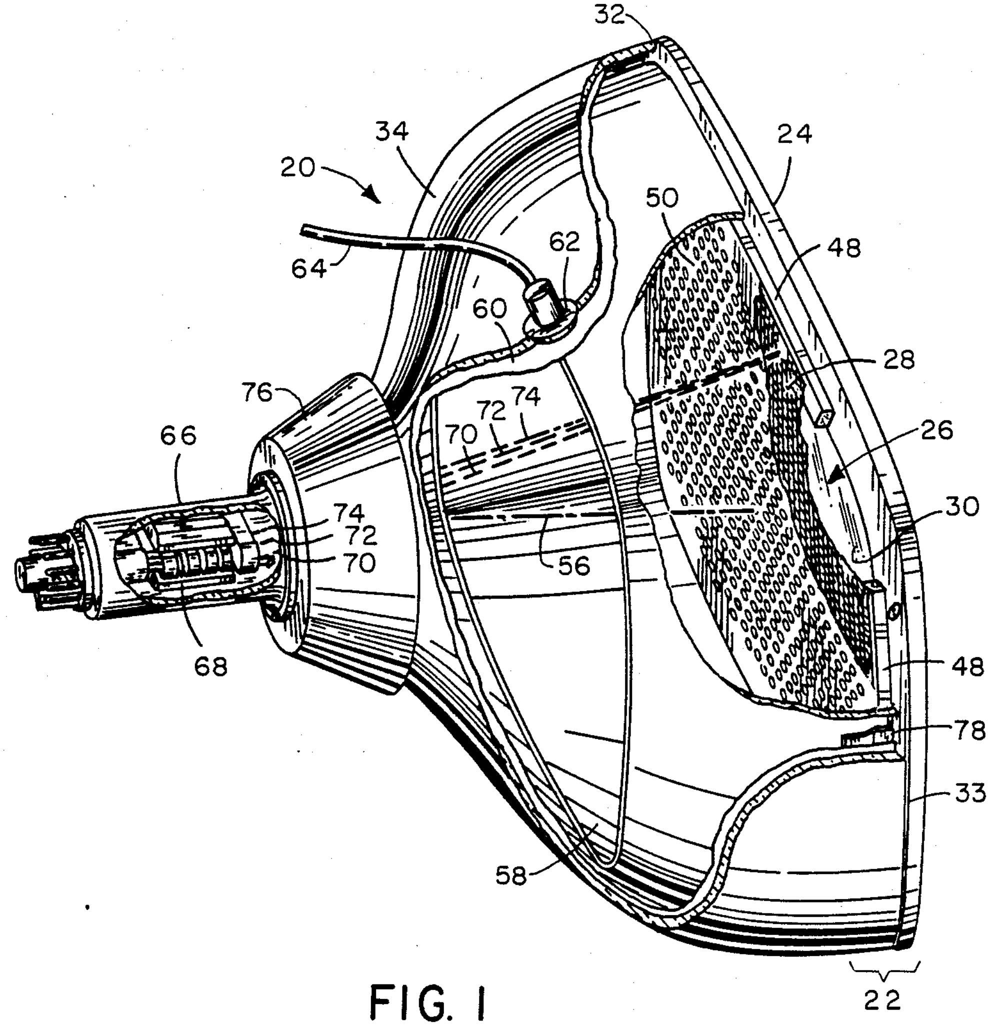
FIG. 1 is a side view in perspective of a color cathode ray tube having a flat faceplate and a tensed foil shadow mask, with cut-away sections that indicate the location and relation of the faceplate and shadow mask to other major tube components.

FIG. 1 depicts a color cathode ray tube 20 having a a front assembly 22 according to the invention. The front assembly 22 of tube 20 includes a faceplate 24. On the inner surface 26 of faceplate 24—known as the "screening surface" in in-process tubes—there is indicated a centrally disposed phosphor screen 28. A film of aluminum 30 is indicated as covering the screen 28. The screen 28 is indicated as being embraced by a peripheral sealing area 32 adapted to mate with the the peripheral sealing area 33 of a funnel 34.

Front assembly 22 includes a faceplate-mounted frame-like metal shadow mask support structure 48 secured to the inner surface 26 of faceplate 24 between sealing area 32 and screen 28. Support Structure 48 has a mask-receiving surface for receiving and supporting a foil shadow mask 50 and holding the mask 50 in tension. The material of the support structure 48 preferably comprises a metal alloy having a coefficient of thermal expansion (CTE) compatible with the CTE of the glass of the faceplate. A suitable material is a nickel-chrome alloy, Carpenter Alloy No. 27, manufactured by Carpenter Technology, Inc., of Reading, Pa. The anterior-posterior axis of tube 20 is indicated by reference number 56. A magnetic shield 58 is shown as being enclosed within funnel 34. High voltage for tube operation is indicated as being applied to a conductive coating 60 on the inner surface of funnel 34 by way of an anode button 62 connected in turn to a conductor 64 that conducts operating potentials from a high-voltage power supply (not shown).

The neck 66 of tube 20 is represented an enclosing an in-line electron gun 68, depicted as providing three discrete in-line electron beams 70, 72 and 74 for exciting respective red-light-emitting, green-light-emitting, and blue-light-emitting phosphor elements on screen 28. Yoke 76 receives scanning signals and provides for the scanning of beams 70, 72 and 74 across screen 28. A contact spring 78 provides an electrical path between the funnel coating 60 and mask support structure 48.

Figure 2:
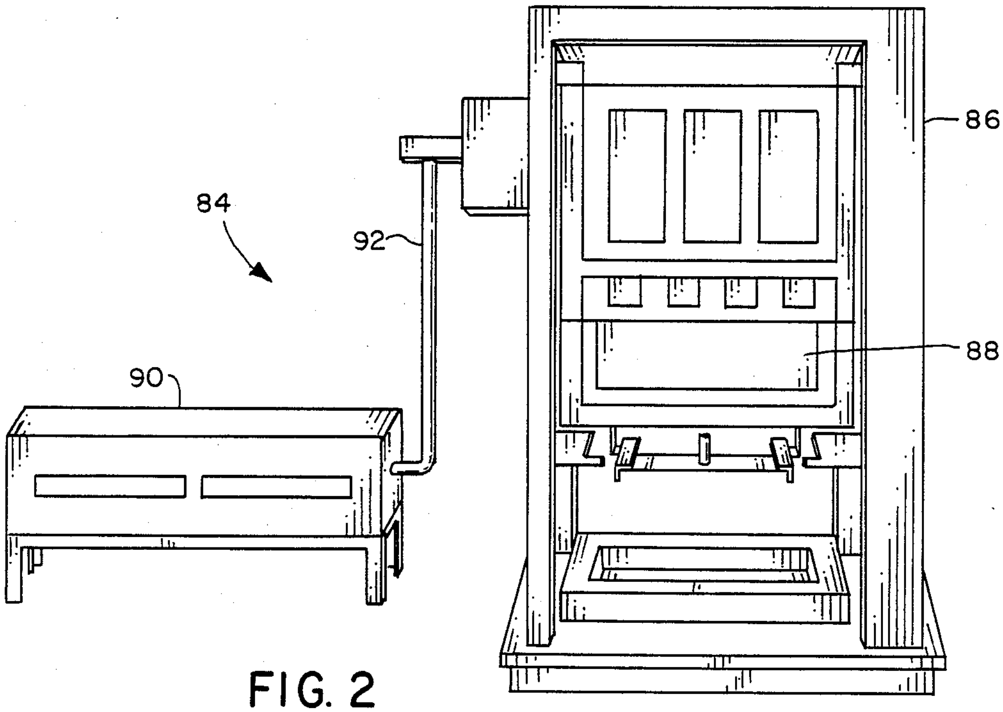
FIG. 2 is a view in elevation and in perspective of a mask welding and severing apparatus used in the implementation of the tension mask securement means and process according to the invention.

The securement of a tension mask and process therefor according to the invention is preferably accomplished by means of the mask welding and severing apparatus 84 depicted in FIG. 2. The apparatus essentially comprises a main frame 86 which includes a camera vision mapping system 88 and a four-station station dial index table (not shown in the figure). Welding is accomplished by means of a carbon dioxide laser 90, the beam of which is conducted to the welding head by conduit 92. Further details concerning the components of this apparatus and its function in achieving the objects of the invention are set forth in following sections.

Figure 3:
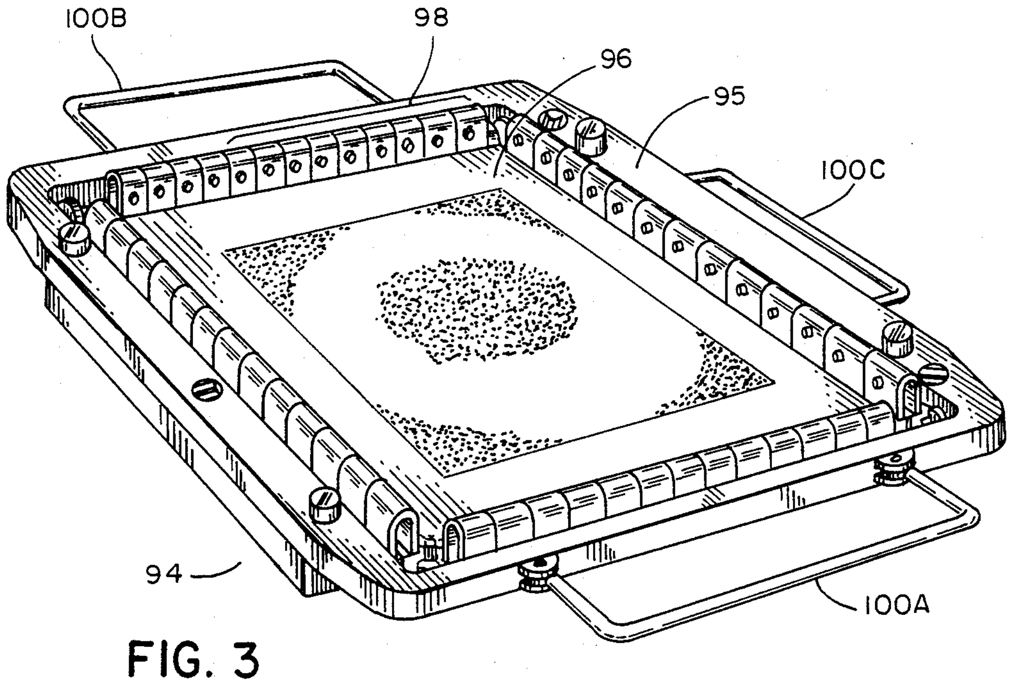
FIG. 3 is an oblique view in perspective of a factory fixture frame according to the invention disclosed in referent copending application Ser. No. 51,896, now U.S. Pat. No. 4,790,896 of common ownership herewith, and which may be utilized in manufacture of a tension mask cathode ray tube according to the means and process of the present invention.

Another component which is preferred for use in achieving the objectives of the invention is the resuable factory fixture frame 94 depicted in FIG. 3. The frame 94 is intended for use in the manufacture of a color cathode ray tube of the type shown by FIG. 1, which is noted as having a flat faceplate and a tension foil shadow mask. Factory fixture frame 94 has three functions: (1) it is an apparatus for mounting an in-process shadow mask, tensing the mask, and retaining the mask in tension; (2) it serves to hold the mask in proper relation to the screening surface of an in-process faceplate during photoexposure of the faceplate in a lighthouse; and (3), it serves as a fixture for retaining the mask in precise relation to the faceplate in the process of welding the mask to the mask support that extends from the faceplate, and finally, in severing the mask from the fixture.

As depicted in FIG. 3, reusable factory fixture frame comprises generally rectangular frame means. It has two sides of interest: the side of the frame 94 indicated in FIG. 3 is designated a first side 95. Frame 94 is represented as supporting an in-process shadow mask 96 in tension by means of mechanical mask-retaining means 98. The factory fixture frame 94 will be noted as having handles 100A, 100B and 100C for convenience in handling during the manfacturing process. Handles 100A and 100B provide for lifting the frame, and handle 100C provides for inserting and removing the factory fixture frame 94 from production machinery such as the the mask welding and severing apparatus 84 depicted in FIG. 2, and the mask tensing and clamping machine 102 depicted in FIG. 4.

Figure 4:
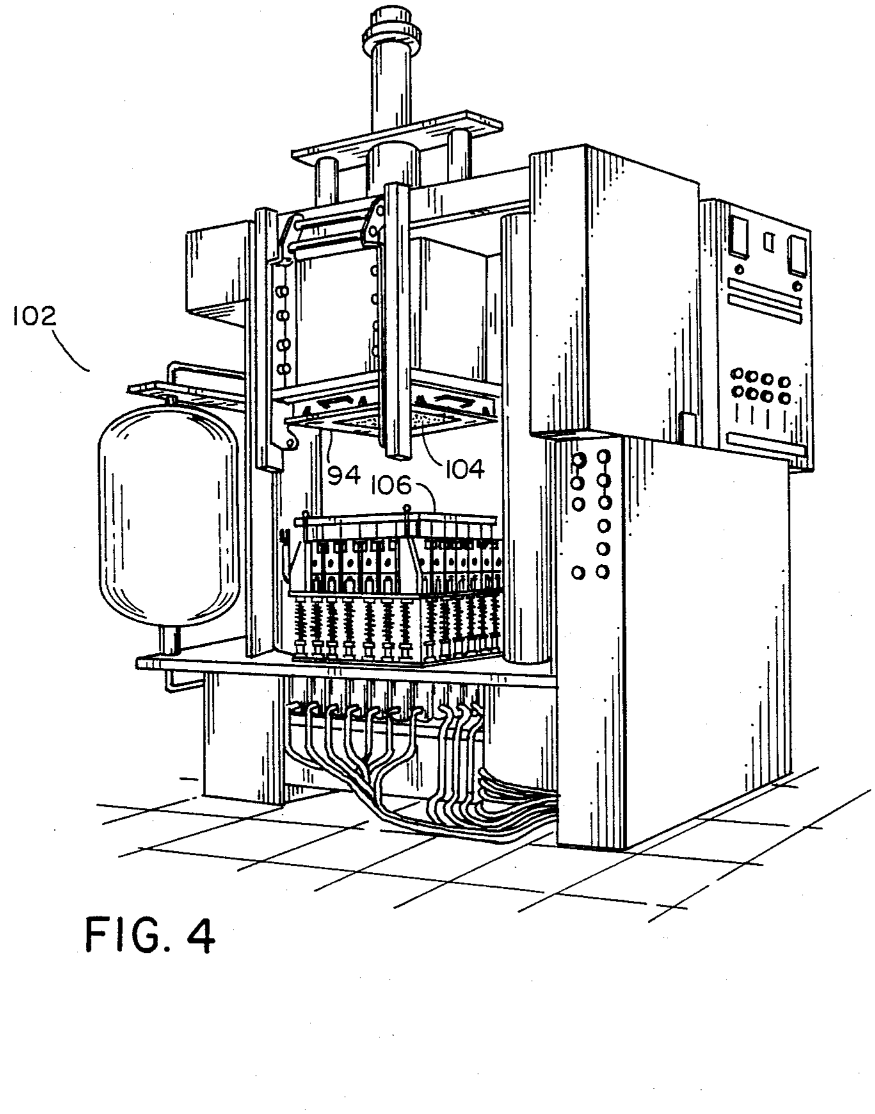
FIG. 4 is a view in elevation and in perspective of a mask tensing and clamping machine for receiving the factory fixture frame of FIG. 3; this machine is also disclosed in referent copending application Serial No. 51,896, now U.S. Pat. No. 4,790,896 of common ownership.

The mask tensing-clamping machine 102 provides for receiving the factory fixture frame 94, which is loaded into machine 102 by hand by an operator, using the handles described. The factory fixture frame 94 is indicated in FIG. 4 as being mounted in machine 102 in preparation for receiving and clamping an in-process shadow mask. Machine 102 is indicated as having an upper platen 104 and a lower platen 106. These platens are heated to provide for expansion of the in-process mask prior to its clamping. The factory fixture frame 94, while clamping and holding the in-process shadow mask 96 in tension, is removed from the mask tensing-clamping machine 102 in readiness for subsequent manufacturing operations.

Figure 5:
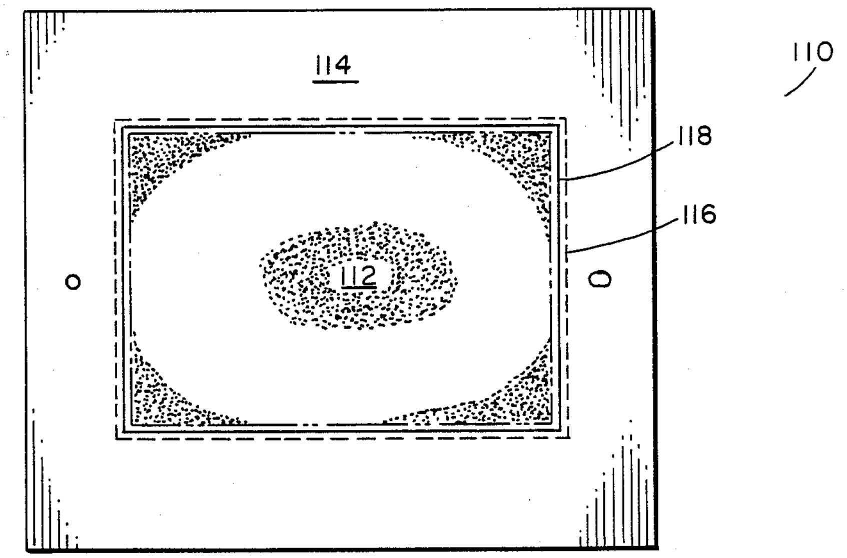
FIG. 5 is a plan view of an in-process shadow mask that is welded and trimmed according to the present invention.

An in-process shadow mask prior to its mounting in factory fixture frame 94 is depicted in FIG. 5. In-process mask 110 comprises a center field 112 of apertures intended for the color selection function in the completed tube. Center field 112 is indicated as being enclosed by a border 114 of unperforated metal which is severed according to the invention from the center field 112 in a later operation at sever line 116, indicated by the dash line. The mask is welded to an underlying mask-receiving surface of the shadow mask support structure at weldment line 118, indicated by the solid line.

Figure 6:
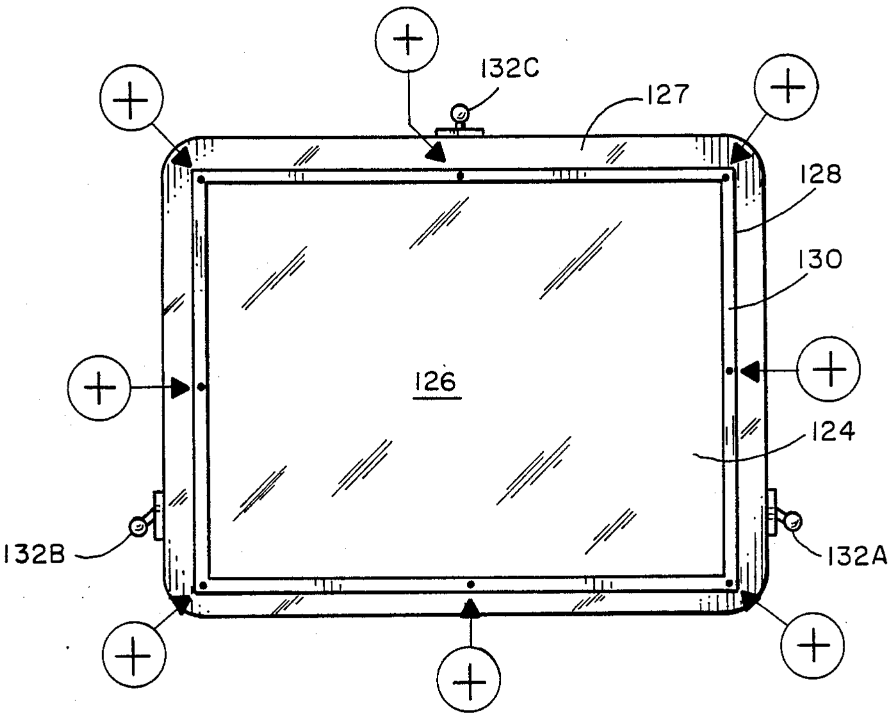
FIG. 6 is a plan view of an in-process faceplate having a support structure to which the in-process shadow mask of FIG. 4 is welded according to the present invention; four corner X-Y coordinate data points and four mid-support X-Y coordinate data points for a camera mapping system are indicated by a (+) symbol.

An in-process faceplate 122, depicted in FIG. 6, is indicated as having on its inner surface 124 a screening area 126 for receiving discrete deposits of phosphors. A frame-like shadow mask support structure 128 has a metallic surface 130 for receiving and securing in-process shadow mask 110 in tension by means to be described. The mask support structure 128 may comprise the metal alloy described (Alloy No. 27), or it may comprise a ceramic having a metal material thereon as disclosed and claimed in referent copending application Ser. No. 866,030, of common ownership herewith.

In-process faceplate 122 is indicated as having indexing means 132A, 132B and 132C extending from the sides thereof; these indexing means are shown as being in the form of ball means, and are noted as being temporarily mounted for indexing purposes. This concept of temporary attachment of the indexing ball means to the faceplate, is described and claimed in referent now U.S. Pat. No. 4,776,822 of common ownership. Temporary indexing means 132A, 132B and 132C provide for precision registration with factory fixture frame 94 and the in-process shadow mask 110 retained in tension therein, as will be described. The (+) symbols represent X-Y coordinate data points, the use of which will also be described.

Figure 7:
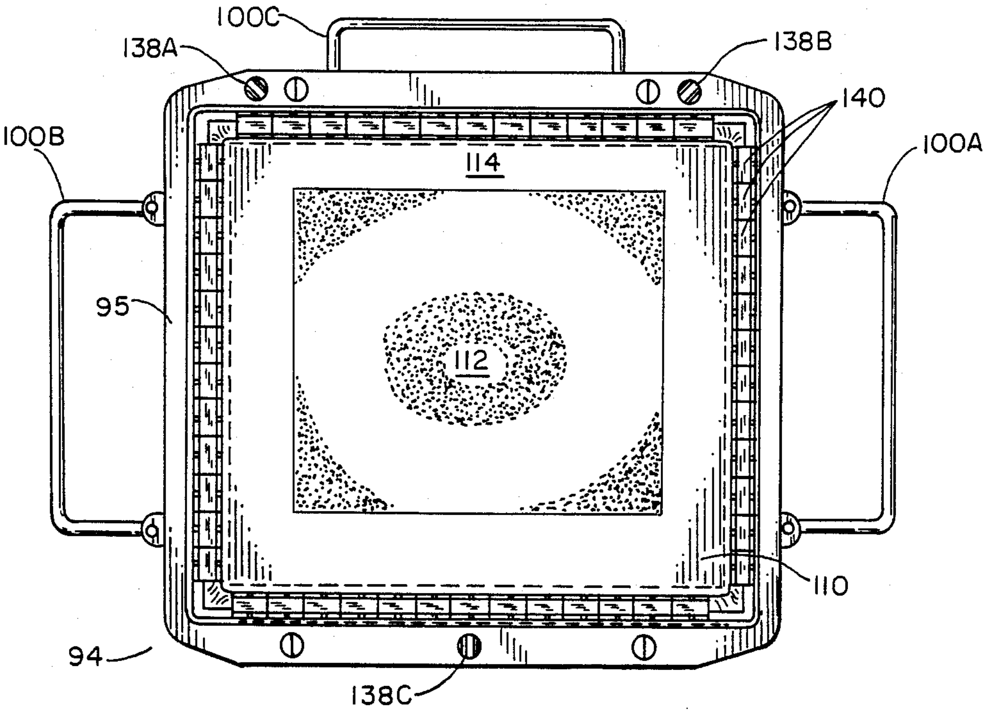
FIG. 7 is a plan view of the first side of the factory fixture frame depicted in FIG. 3, and indicating details of the indexing means utilized in the mask securement means and and process of the present invention.
Figure 8:
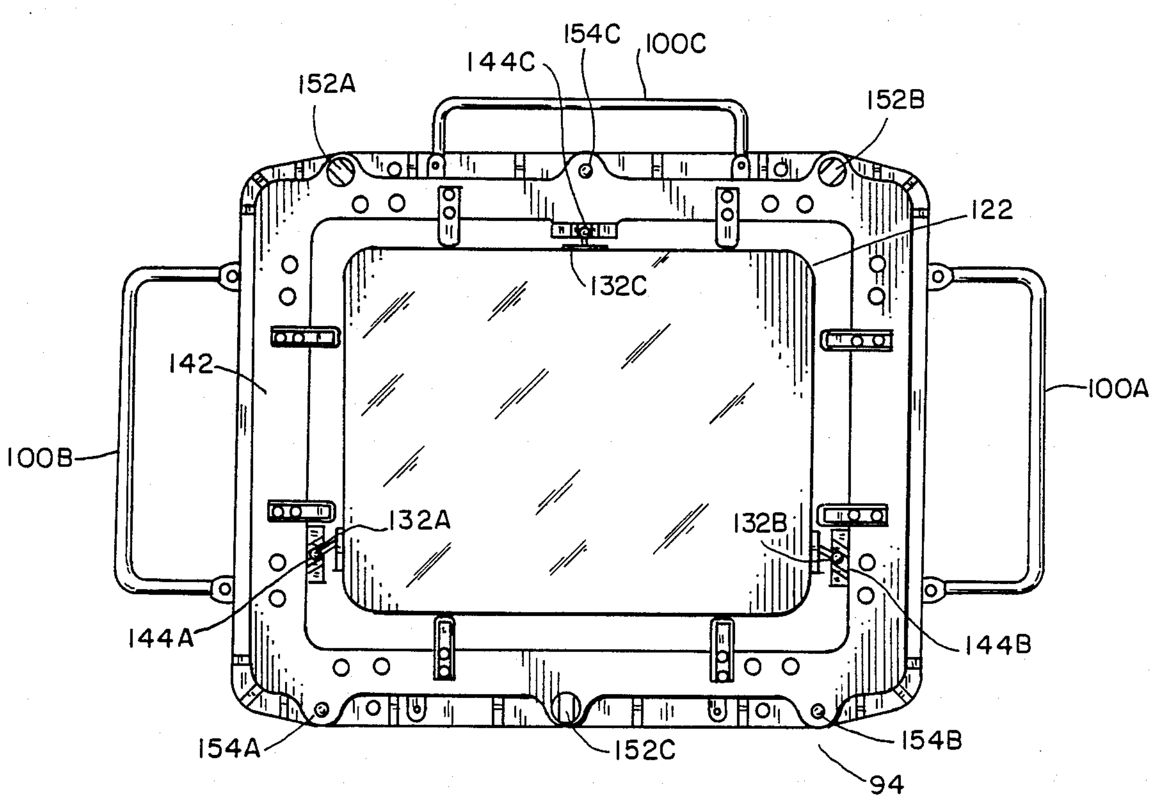
FIG. 8 is a plan view of a second side of the factory fixture frame shown by FIG. 3, and showing the precision mounting of an in-process faceplate in the frame.

Factory fixture frame 94, depicted previously in FIG. 3, and noted as having two sides of interest, is also depicted in FIGS. 7 and 8. In-process mask 110 is represented as being mounted in frame 94. With respect to first side 95 shown by FIG. 7, six-point indexing means 138A, 138B and 138C provide for registration with complementary registration affording means on the mask welding and severing apparatus depicted in FIG. 2, the details of which will be described. The mechanical mask retaining means for clamping and holding in-process mask 110 in tension are depicted as being in the form of a series of spring clips 140 which are installed by the mask tensing and clamping machine 102. The spring clip means for clamping the in-process mask in tension are fully described and claimed in referent copending application Ser. No. 140,019, of common ownership herewith.

The second side of factory fixture frame 94 is depicted in FIG. 8. Precision registration of the in-process faceplate 122 with the factory fixture frame 94 is indicated wherein indexing ball means 132A, 132B and 132C, which extend from the edges of faceplate 122, are represented as registering with indexing groove means 144A, 144B and 144C shown as extending internally from factory fixture frame 94.

A photoscreening process then follows. The in-process shadow mask, which in effect functions as a perforated optical stencil, is used in conjunction with a light source to expose in successive steps, at least three consecutively applied light-sensitive photoresist patterns on the screening surface. A shadow mask is typically "mated" to a faceplate; that is, the same mask with associated faceplate is used in the production of a specific tube throughout the production process, and is permanently installed in the tube in final assembly. Four engagements and four disengagements of the mask, as well as six exposures, are usually required in the standard photoscreening process. In certain of the processes, a shadow mask "master" may be used for exposing the photo-resist patterns on all faceplates, in lieu of a shadow mask permanently mated to the faceplate and its screen.

The means of precision registration of faceplate 122 with frame 94 described in the foregoing is repeated in connection with the shadow mask securement means and process according to the invention, in which the in-process shadow mask 110 is welded to the shadow mask support 128 that extends from the inner surface of faceplate 120. The means and process according to the present invention are described in following paragraphs.

Figure 9:
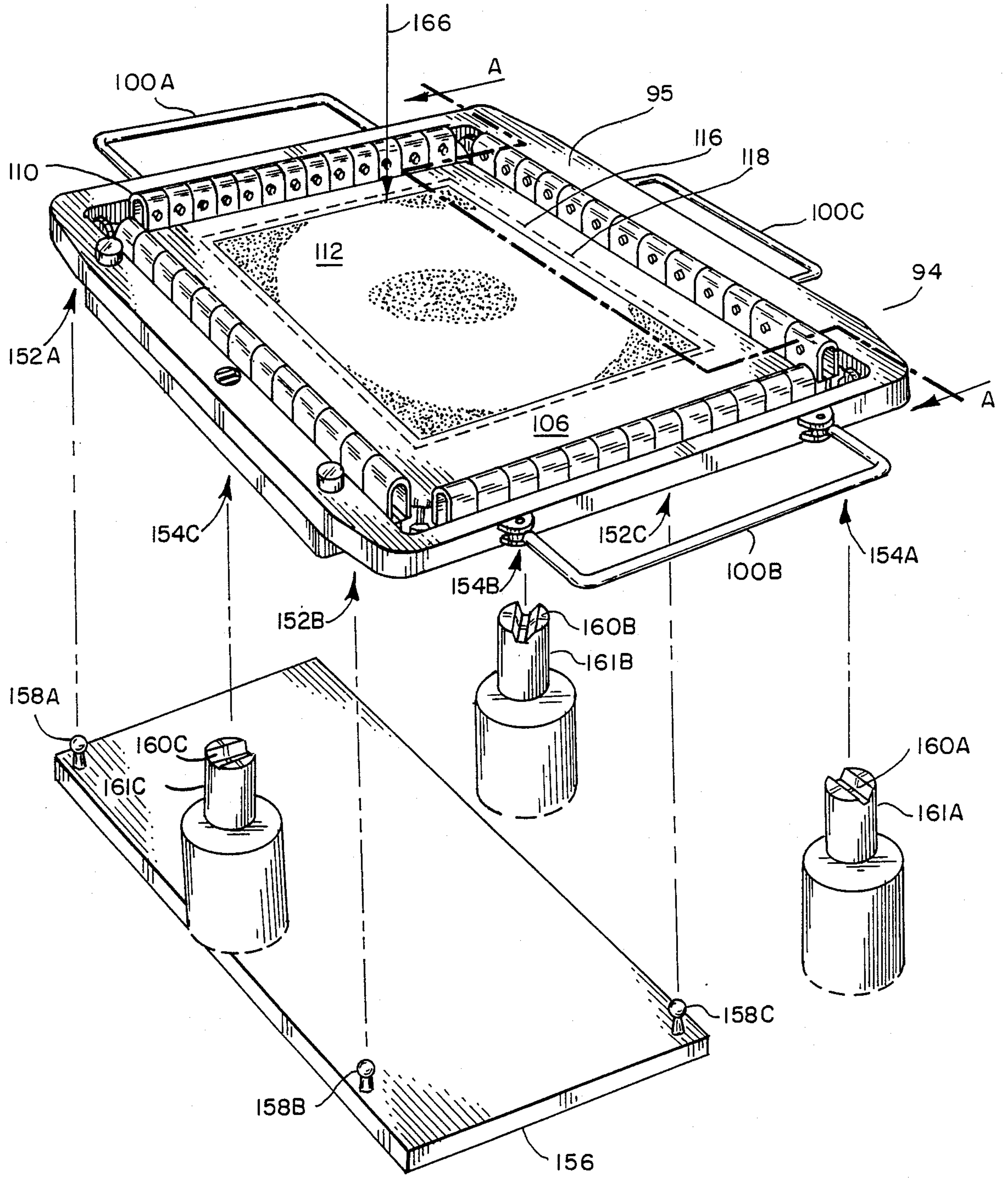
FIG. 9 is a view in perspective that depicts diagrammatically the means for mounting and registering the factory fixture frame and the enclosed shadow mask with means for mask welding and severing according to the invention.

With reference now to FIG. 9, there is indicated diagrammatically a receiving fixture 156 which is a part of a mask welding and severing apparatus 84 depicted in FIG. 2. The apparatus includes a carousel (not shown) which rotates to four stations in the process of welding an in-process shadow mask held in tension in the factory fixture frame to a mask support structure, and severing the resulting mask-faceplate assembly from the frame. In consequence of this process, the factory fixture frame is released for the temporary installation of a new in-process mask, and the faceplate assembly with the mask secured to the mask support, and which comprises the end-product, is released for attachment to a funnel.

Receiving fixture 156 is indicated as having three indexing means 158A, 158B and 158C represented as being in the form of ball means extending upwardly from fixture 156. Indexing means 158A, 158B and 158C provide for indexing with complementary six-point indexing means 152A, 152B and 152C located on the second side 142 of factory fixture frame 94 as indicated in FIG. 8. Indexing means 152A, 152B and 152C are indicated as being in the form of radially oriented grooves. These indexing means provide for the "gross" (as opposed to "fine") registration of the factory fixture frame 82 and its tensed in-process shadow mask 110, with the mask welding and tensing machine. Installation of the frame 94 on receiving fixture 156 is accomplished manually by means of the handles 100A, 100B and 100C.

The precise location and configuration of the mask-receiving surface 130 of the shadow mask support structure 128 of the in-process faceplate 122 is mapped by camera means in a second station (not shown) of the mask welding and severing apparatus 84. The receiving fixture 156, with the factory fixture frame 92 mounted thereon, is then rotated to a third station of the mask welding and severing apparatus 84 along with the in-process faceplate 122. At this third station, the fine registration means are brought into play to ensure exact and precise registration of the factory fixture frame 94 and clamped-in shadow mask with in-process faceplate 122, and exact registration of the combination of frame, mask and faceplate with the welding head of the mask welding and severing apparatus 86.

With reference again to FIG. 8, the fine registration means comprise six-point indexing ball means 154A, 154B and 154C. Complementary to six-point indexing ball means 154A, 154B and 154C are the associated six-point indexing means indicated in FIG. 9 as comprising groove means 160A, 160B and 160C located atop respective ram heads 161A, 161B and 161C. Ram heads 161A, 161B and 161C are in turn mounted on a separate platform (not shown), and are raised in unison to cause groove means 160A, 160B and 160C to engage respective the six-point indexing ball means 154A, 154B and 154C, located on second side 142 of the frame 94, and to lift factory fixture frame 94 in precise, fine alignment with the laser beam that is used to weld the in-process mask 110 to the mask-receiving surface 130 of mask support structure 128.

In effect, factory fixture frame 94 has two related sets of six-point indexing means: The first of the sets provides for transporting frame 94 into a gross position relative to an operation utilizing the in-process mask, noted as being a laser mask welding and severing operation according to the invention. The second of the sets provides for assuring precision in positioning the center field of apertures 112 of the in-process mask 110 relative to the screening area 126 of the faceplate 122; also, in the precise positioning of the frame 94 with the welding head during the welding and severing operation.

Figure 10A:
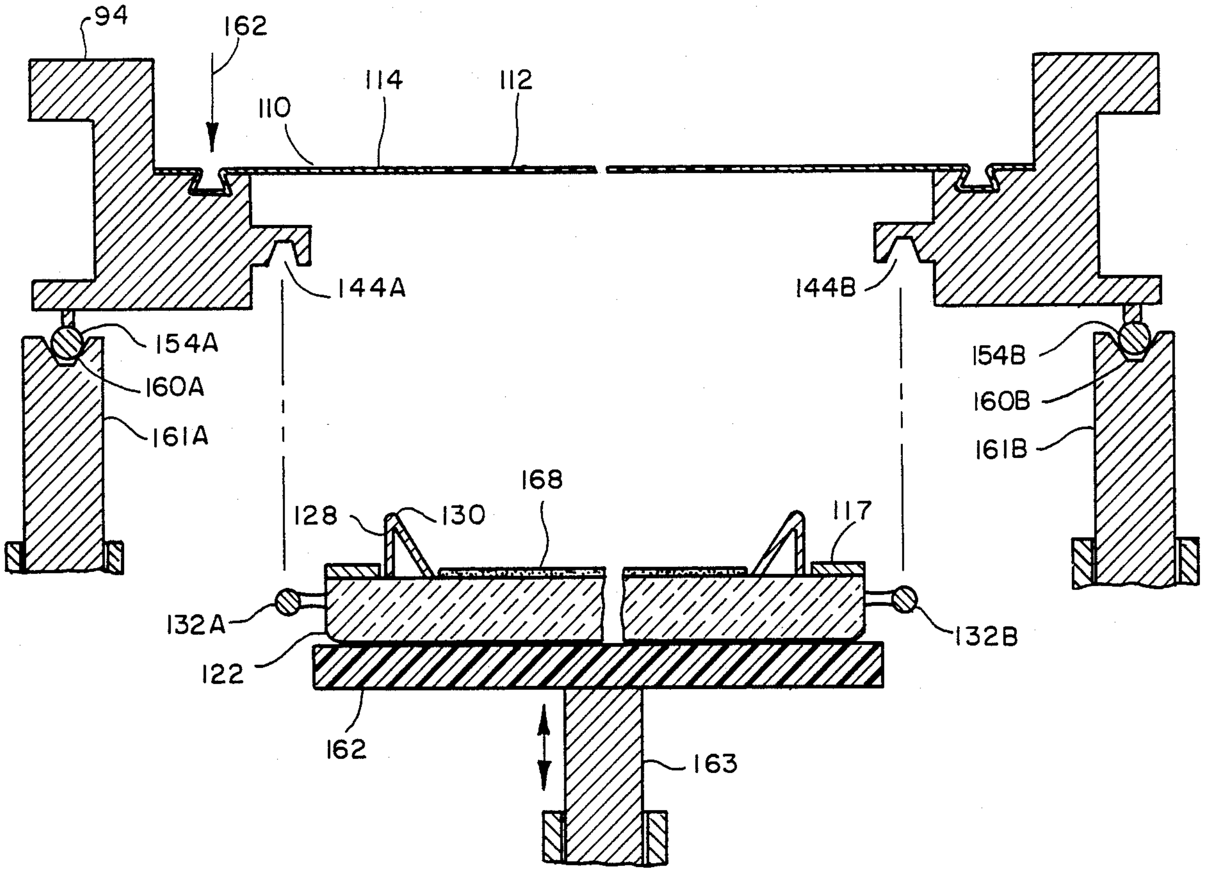
FIGS. 10A and 10B are sectional views in elevation taken along lines A—A of FIG. 9, and showing the sequence of precision registration of the factory fixture frame with means for mask welding and severing.
Figure 10B:
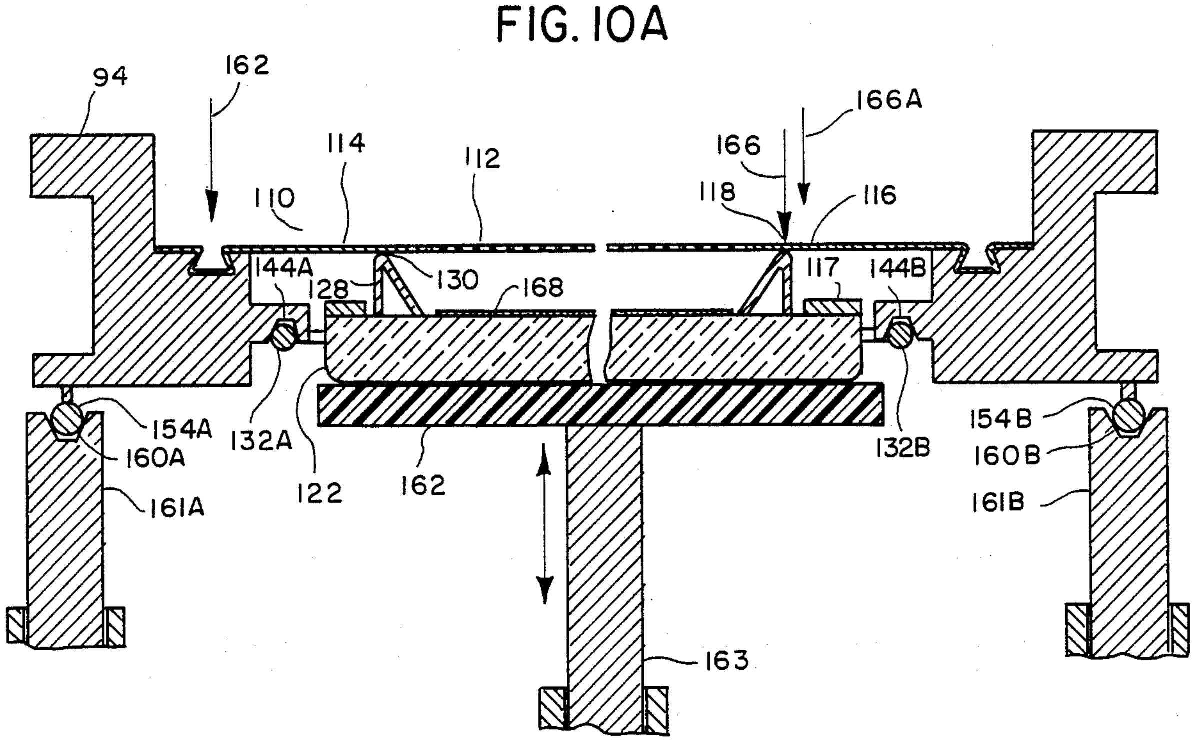

The function of the second of the sets of six-point indexing means for assuring absolute accuracy is depicted highly schematically in FIGS. 10A and 10B. Ram heads 161A and 161B (in conjunction with ram head 161C, not shown) are indicated as having lifted factory fixture frame 94 from the gross position wherein the frame 94 was resting on ball means 158A, 158B and 158C of receiving fixture 156 (see FIG. 9) by the conjunction of the ball means with groove means 152A, 152B and 152C located on the second side 142 of frame 94. The clamping of in-process mask 110 in frame 94 is indicated schmatically by arrow 162. In-process faceplate 122 is depicted as resting on carriage 162, indicated symbolically as being made of a plastic. A plastic softer than the glass of the faceplate is preferred as a material for carrying the faceplate to avoid scratching or other abrasion of the surface.

As indicated by the associated arrow, carriage 162 can be raised and lowered by the pneumatic piston 163, depicted in FIG. 10A as being in the lowered position, and FIG. 10B as being in the raised position.

FIG. 10B depicts in-process faceplate 122 as having been lifted by piston 163 into exact registration with factory fixture frame 94 and with the in-process shadow mask 110 held in tension therein. The means of registration of the in-process faceplate 122 with the factory fixture frame 94 are indicated as comprising the conjunction of ball means **132*a*, 132B (and 132C, not shown) that extend from faceplate 122 with groove means 144A, 144B (and 144C, not shown) that extend inwardly from factory fixture frame 94. The mask-receiving surface 130 of shadow mask support structure 128 is indicated in FIG. 10B as being in intimate, uniform contact with the in-process shadow mask 110. It is essential for proper welding that the mask-receiving surface 130 be absolutely clean and unoxidized. The mask 110 could as well be in a negative interference relationship with the mask-receiving surface 130 of mask support structure 128** until the time of welding the mask to the mask support, an inventive concept that is fully described and claimed in referent U.S. Pat. No. 4,778,427, of common ownership herewith.

The in-process mask 110, still clamped in tension in the factory fixture frame 94, is welded to mask receiving surface 130 of the shadow mask support structure 128 by the means and process according to the invention; the weld line 118 is indicated in FIGS. 5 and 9. The welding process is indicated schematically in FIG. 9 by arrow 166 which represents the laser beam. Upon completion of the welding, the laser beam is changed to a continuous wave mode, and the border 114 of unperforated metal of in-process shadow mask 96 is severed at the line of severance 116, indicated in FIG. 10B; the line of severance 116 is also indicated in FIGS. 5 and 9. The severing beam is indicated by the arrow in FIG. 10B.

To prevent damage to the faceplate-funnel sealing area 127 of faceplate 122 from the laser beam during the severing process, a shield 117 is laid over the sealing area. Shield 117 may comprise a material that reflects the laser radiation and is not damaged by the beam. A suitable material is aluminum having a thickness of at least five mils.

Upon completion of the severing operation, the in-process shadow mask 110, now firmly welded to the mask-receiving surface 130 mask support structure 128, is free of the factory fixture frame 94, and the assembly has become a viable faceplate assembly complete with a phosphor-bearing screen 168, and ready for attachment to a funnel. The attachment of a faceplate assembly 22 to a funnel 34 depicted in FIG. 1.

The laser beam generator is, by way of an example, a 600 watt Model 810 carbon dioxide laser; the location of the laser 90 is indicated in FIG. 2. The laser can be operated in either the pulsed mode or in the continuous-wave mode. The manufacturer of the Model 810 is Spectra Physics, Inc., of San Jose, Calif. Other laser and related equipment offered by other manufacturers may as well be used provided that it fully meets the specifications and characteristics of the equipment described.

As indicated in FIG. 2, the beam is conducted to the welding head by conduit 92, depicted as including a number of beam benders. Ancillary equipment includes sources of gases such as helium, nitrogen and carbon dioxide, and means for controlling gas flow rates. The operating pressure of the laser is $90\pm2$ millibars. A source of chiller water at a temperature in the range of 64 to 68 degrees F is also required. Beam focus is made adjustable, with the proper setting retained by locking means.

The weldments of a faceplate assembly according to the invention are spaced close enough to hold the shadow mask in tension without distortion to the material of the mask intermediate to the weldments due to the tension; yet the weldments are spaced widely enough to provide for relatively rapid welding and strong, independent welds. The weldments according to the invention are spaced apart a distance in the range of 15 to 35 mils, and preferably about 25 mils. The welding interval pulse width according to the invention is a width of about 3 milliseconds, and the energy-per-pulse is an energy of $0.83\pm0.03$ joules.

The weldments on the faceplate assembly according to the invention include the step of initially tacking the mask to the support structure with widely spaced weldments to preclude rotational misalignment with respect to the screen, followed by the more narrowly spaced weldments described heretofore. The spacing of the tacking weldments is in the range of 0.200 to 0.500 inch according to the invention. Rotational misalignment of the mask with respect to the screen was found to occur in masks welded absent the initial tacking procedure according to the invention.

Figure 11:
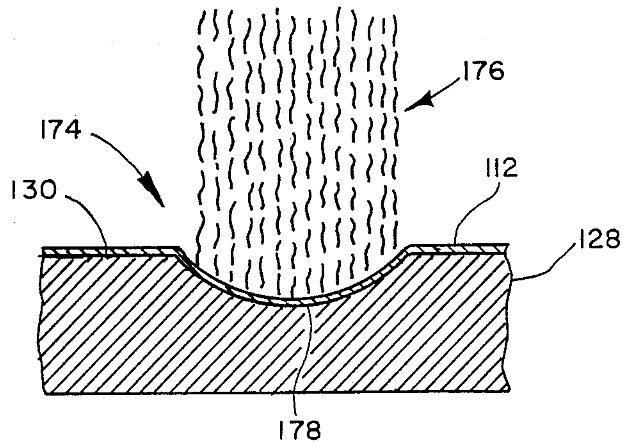
FIG. 11 is a view in elevation and section of a crater produced by a laser beam in welding, and representing the unmistakable "signature" of the laser weldment.

The weldments of the front assembly according to the invention are distinguished by being in the form of a crater in the foil of the shadow mask that extends into the mask-receiving surface; the characteristics of the crater are unmistakably typical of a laser weld. An example of such a "laser signature" crater is depicted in FIG. 11 wherein crater 174 is depicted as extending into the mask-receiving surface 130 of a mask support structure 128 by laser beam 176. The area of fusion 178 of the steel foil mask 112 with the nickel alloy of the mask support 128 is indicated. This cratering is a laser signature unmistakably distinguishable over the the insignia left by other types of welding such as spot, seam, projection, upset and flash, wherein the fusion takes place between the two metals to be joined with no appreciable cratering. Although an arc weld may leave a crater, there is usually an easily distinguishable deposit of filler metal from the welding rod which substantially fills the crater.

The laser beam diameter is preferably in the range of 0.012 to 0.015 inch, and the distance of the beam nozzle from the workpiece is in the range of 0.145 to 0.190 inch. Further, the pulse width "on" time according to the invention is preferably about 3.0 milliseconds, with an "off" time of 3.67 milliseconds. The beam velocity during welding; that is, the rate of traverse, is preferably about 3.3 inches per second. An effusion of nitrogen gas around the beam at the rate of about 25 cubic feet per hour provides for shielding the weld area from oxidation and the intrusion of other impurities during the welding cycle.

The welding interval pulse width and the energy-per-pulse according to the invention make it possible to weld the very thin steel foil to the relatively thick shadow mask support, noted as being a nickel alloy. It was originally considered that the welding of two materials of such dissimilarity and of such different thicknesses was an impossibility. If the energy of the beam is too great, and/or the pulse width is too long, the beam will perforate and burn the foil without making a bond. If the beam energy is too small and/or and pulse width too short, there will be no fusion of the foil to the metal of the support surface.

With regard to the use of the laser beam to sever the border 114 of unperforated metal of the in-process mask 110, the same laser beam is used for severing as well as for welding. The severing beam 166A is indicated by the arrow in FIG. 10B. It will be noted that the beam is caused to moved outwardly from the path of the weld to traverse sever line 116, which may be from 0.050 to 0.100 inch outside the weld line 118. With regard to the parameters of the severing beam, the mode is continuous wave, which provides a cleaner cut than can be obtained than when operating in the pulsed mode. The continuous wave power is about 200 watts, and the velocity of beam traverse is preferably from 4 to 6 inches per second. As with welding, nitrogen gas is used during severing as a shield against oxidation and the intrusion of other impurities. The result is a very clean cut.

A mask welding apparatus according to the invention has a laser beam for welding an in-process foil shadow mask tensed in a holding fixture to a frame-like shadow mask support structure secured to the inner surface of an in-process faceplate and having a mask-receiving surface. The apparatus includes means moving the beam in welding relationship to the mask-receiving surface, and controlling the beam to weld the mask to the mask-receiving surface. The apparatus includes means for severing the mask from the holding fixture along a severing line. The apparatus includes the mapping means 88 indicated in FIG. 2 for creating a map of the mask-receiving surface in terms of X-Y coordinate data. The mapping machine consists of an eight-camera vision system, with the cameras focused on eight points on the mask receiving surface 130. As indicated by the (+) symbols in FIG. 6, four of the points are at the corners of the mask support structure 128, and four midway between the corners. The vision system is manufactured by Allen-Bradley of Milwaukee, Wis. under the designation "Expert Vision System."

The illustrated preferred mapping machine 88 is fully described and claimed in copending application Ser. No. 138,994, filed Dec. 29, 1987.

The apparatus also includes faceplate positioning means for positioning the faceplate and the mask-receiving surface in mapping relationship with the mapping means. The apparatus according to the invention also includes means for positioning and moving the beam to follow the map. The equipment that translates the data produced by the vision system for control of the laser welding head is a Model 8200 numerical control system also manufactured by Allen-Bradley.

Welding head means of the apparatus for welding the foil mask to the mask-receiving surface include an X-Y servo slide assembly for position control of the laser welding head, and means for transmitting the coordinates to the X-Y servo slide assembly of the welding head means.

Assembly means provide for assembling and positioning the faceplate and the mask-receiving surface of the support structure in coordinate relationship with the shadow mask, and in firm contact with the mask. Such assembly means are depicted in FIG. 8, and explained by the accompanying description. The means for positioning the mask-receiving surface in firm contact with the mask and in welding relationship with the welding head means are indicated by FIGS. 10A and 10B, with the accompanying description.

The apparatus according to the invention further includes means for controlling the operating mode,.the pulse width, and energy-per-pulse of the laser beam to provide a beam effective to weld the mask to said mask-receiving surface, and sever the mask from the holding fixture.

The factory fixture frame 94 is reinstalled in the mask tensing-clamping machine 102, and the remainder of the mask 110 that remains clamped in the frame 94; that is, the border 106 of unperforated metal, is removed from the frame, and a new in-process mask is tensed and clamped in the frame. The cycle of faceplate photoscreening, and mask welding and severing, is then repeated.

A process according to the invention for use in the manufacture of a color cathode ray tube is described in following paragraphs. The tube has a flat faceplate and a flat tension mask including a faceplate-mounted, frame-like mask support structure having a mask-receiving surface. The process for welding an in-process mask to the mask-receiving surface comprises— mapping the mask-receiving surface and developing X-Y coordinate data identifying the size, configuration and position of the mask-receiving surface;

positioning the faceplate and the mask-receiving surface in mapping relationship with the mapping means;

providing welding head means including a laser welding head for welding the mask to the mask-receiving surface, the means including X-Y servo slide assembly means for position control of the laser welding head;

positioning the faceplate and the mask-receiving surface of the support structure in coordinate relationship with the shadow mask;

positioning the assembly means in welding relationship with the welding head means;

transmitting the X-Y coordinate data provided by the mapping means to the X-Y servo slide assembly of the welding head means for controlling the laser welding head means;

using the X-Y coordinate data to guide the laser welding head;

tacking the mask to the support structure with widely spaced weldments to preclude rotational misalignment of the mask with respect to the screen;

welding the mask to the mask-receiving surface of the mask support structure while providing a welding interval pulse width of about 3 milliseconds, and an energy-per-pulse of 0.83 ±0.3 joules.

While a particular embodiment of the invention has been shown and described, it will be readily apparent to those skilled in the art that changes and modifications may be made in the inventive means and method without departing from the invention in its broader aspects, and therefore, the aim of the appended claims is to cover all such changes and modifications as fall within the true spirit and scope of the invention.

What is claimed is:

1. A welding apparatus having a laser beam for welding an in-process foil shadow mask to a faceplate-mounted, frame-like shadow mask support structure secured to the inner surface of an in-process faceplate and having a mask-receiving surface, the apparatus comprising mapping means for creating a map of said mask-receiving surface and means for moving said beam to follow said map and in welding relationship to said mask-receiving surface and controlling said beam to weld said mask to said mask-receiving surface.

2. The laser welding apparatus according to claim 1 wherein said apparatus includes means for severing said mask from a fixture holding said mask in tension.

3. The laser welding apparatus according to claim 1 wherein said beam creates a series of laser-signature craters in said mask that extend into said mask-receiving surface.

4. The laser welding apparatus according to claim 1 wherein said means for controlling said laser beam include means for causing said beam to tack said mask to said support prior to said welding.

5. The laser welding apparatus according to claim 1 wherein said apparatus includes means for controlling the welding interval pulse width, and the energy-per-pulse of said beam.

6. The laser welding apparatus according to claim 5 wherein said welding interval pulse width is a width of about 3 milliseconds, and said energy-per-pulse is an energy of 0.83±0.03 joules.

7. An apparatus for severing an in-process foil shadow mask tensed in a holding fixture and in contact with a shadow mask support structure from said fixture, the apparatus including a laser beam, mapping means providing a map of said shadow mask support structure, and means for moving said beam in accordance with said map and controlling the operating mode of said beam for the positive severing of said mask from said fixture.

8. A welding and severing apparatus having a laser beam for welding an in-process foil shadow mask tensed in a holding fixture to a frame-like shadow mask support structure secured to the inner surface of an in-process faceplate and having a mask-receiving surface, and for severing said mask from said holding fixture along a severing line, the apparatus comprising:

mapping means for creating a map of said mask-receiving surface, and means for positioning and moving said beam to follow said map;

means for controlling the operating mode, the welding interval pulse width, and energy-per-pulse of said beam to provide a beam effective to weld said mask to said mask-receiving surface, and sever said mask from said holding fixture.

9. The laser welding apparatus according to claim 8 wherein said welding interval pulse width is a width of about 3 milliseconds, and said energy-per-pulse is an energy of 0.83±0.03 joules.

10. A laser welding apparatus for welding an in-process foil shadow mask to a frame-like shadow mask support structure secured to the inner surface of an in-process faceplate and having a mask-receiving surface, said mask having a border for gripping said mask during the tensioning of said mask, said mask-support structure embracing a centrally disposed phosphor screen of said faceplate, the apparatus comprising:

mapping means for mapping said mask-receiving surface in terms of X-Y coordinate data;

faceplate positioning means for positioning said faceplate and said mask-receiving surface of said support structure in mapping relationship with said mapping means;

welding head means having a laser welding head for welding said mask to said mask-receiving surface, said means including X-Y servo slide assembly means for position control of said laser welding head;

means for transmitting said X-Y coordinate data provided by said mapping means to said X-Y servo slide assembly of said welding head means;

assembly means for assembling and positioning said faceplate and said mask-receiving surface of said support structure in coordinate relationship with said shadow mask, and in firm contact with said mask;

means for positioning said assembly means into welding relationship with said welding head means;

whereby said mapping means provides for guiding said laser welding head in the welding of said foil shadow mask to said mask support structure.

11. The apparatus according to claim 10 wherein said apparatus includes means for controlling the welding interval pulse width and energy-per-pulse of said beam.

12. The apparatus according to claim 11 wherein said welding interval pulse width is a width of about 3 milliseconds and said energy-per-pulse is an energy of 0.83±0.03 joules.

13. The apparatus according to claim 11 wherein said apparatus includes means for severing said border by means of said laser beam.

14. A laser welding apparatus for welding an in-process foil shadow mask to a frame-like shadow mask support structure secured to the inner surface of an in-process faceplate and having a mask-receiving surface, said mask having a border for the tension of said mask, and for the temporary securement of said mask in a factory fixture frame, said mask-support structure embracing a centrally disposed phosphor screen of said faceplate, the apparatus comprising:

mapping means for mapping said mask-receiving surface in terms of X-Y coordinate data;

faceplate positioning means for positioning said faceplate and said mask-receiving surface of said support structure in mapping relationship with said mapping means;

welding head means having a laser welding head for welding said mask to said mask-receiving surface, said means including X-Y servo slide assembly means for position control of said laser welding head, said welding head means providing a welding interval pulse width of about 3 milliseconds and energy-per-pulse of 0.83±0.03 joules.

means for transmitting said X-Y coordinate data provided by said mapping means to said X-Y servo slide assembly of said welding head means;

assembly means for assembling and positioning said faceplate and said mask-receiving surface of said support structure in coordinate relationship with said shadow mask, and in firm contact with said mask;

means for positioning said assembly means into welding relationship with said welding head means;

means for severing said border by means of said laser welding head;

whereby said mapping means provides for guiding said laser welding head in the welding of said foil shadow mask to said mask support structure, and the severing of said mask from said factory fixture frame.

15. For use in the manufacture of a color cathode ray tube having a flat faceplate and a flat tension mask including a faceplate-mounted, frame-like mask-support structure having a mask-receiving surface, a process for welding an in-process mask to said mask-receiving surface comprising:

mapping said mask-receiving surface and developing X-Y coordinate data for identifying the size, configuration and position of said mask receiving surface;

positioning said faceplate and said mask-receiving surface of said support structure in coordinate relationship with said shadow mask;

using said X-Y coordinate data to guide a laser welder for welding said mask to said mask-receiving surface of said mask support structure.

laser welding said mask to said mask-receiving surface of said support structure by initially tacking said mask to said support structure with widely spaced weldments to preclude rotational misalignment of said mask with respect to said screen, followed by narrowly space weldments.

16. For use in the manufacture of a color cathode ray tube having a flat faceplate and a flat tension mask including a faceplate-mounted, frame-like mask support structure having a mask-receiving surface, a process for welding an in-process mask to said mask-receiving surface comprising:

mapping said mask-receiving surface and developing X-Y coordinate data identifying the size, configuration and position of said mask-receiving surface;

positioning said faceplate and said mask-receiving surface in mapping relationship with said mapping means;

providing welding head means including a laser welding head for welding said mask to said mask-receiving surface, said means including X-Y servo slide assembly means for position control of said laser welding head;

positioning said faceplate and said mask-receiving surface of said support structure in coordinate relationship with said shadow mask;

positioning said assembly means in welding relationship with said welding head means;

transmitting said X-Y coordinate data provided by said mapping means to said X-Y servo slide assembly of said welding head means for controlling said laser welding head;

using said X-Y coordinate data to guide said laser welding;

tacking said mask to said support structure with widely spaced weldments to preclude rotational misalignment of said mask with respect to said screen;

welding said mask to said mask-receiving surface of said mask support structure while providing a welding interval pulse width of about 3 milliseconds, and an energy-per-pulse of $0.83 \pm 0.3$ joules.

17. A welding apparatus having a laser beam for welding an in-process, tensed foil shadow mask to a shadow mask support structure secured to the inner surface of an in-process faceplate and having a mask-receiving surface, the apparatus comprising:

mapping means for creating a map of said mask-receiving surface, and means for positioning and moving said beam to follow said map; and means for controlling the operating mode including the welding interval pulse width and energy-per-pulse of said beam to provide a beam effective to weld said mask to said mask-receiving surface.

* * * * *